United States Patent Office 3,271,382
Patented Sept. 6, 1966

3,271,382
RECOVERY OF LIGNOSULFONATES FROM SPENT SULFITE LIQUORS
George R. Quimby and Otto Goldschmid, Shelton, Wash., assignors to Rayonier Incorporated, Shelton, Wash., a corporation of Delaware
No Drawing. Filed Sept. 26, 1963, Ser. No. 311,669
2 Claims. (Cl. 260—124)

This invention relates to the recovery of lignosulfonates from spent sulfite liquors resulting from the pulping of wood, and has for its object, the provision of an improved process for separating lignosulfonates from said spent liquors, and also selectively separating the lignosulfonates into fractions according to molecular weights.

Spent sulfite cooking liquors from the pulping of wood contain a substantial portion of the wood as dissolved solids usually in a proportion of about 60 percent lignosulfonates, 30 percent wood sugars and 10 percent inorganic salts and miscellaneous by-products of the pulping. This invention provides an efficient process for separating out and recovering the lignosulfonates from said spent liquor thus leaving it proportionately enriched in wood sugars, etc. The invention is based on the discovery that at ambient temperatures, certain high molecular weight quaternary ammonium salts will quickly and almost quantitatively precipitate lignosulfonates from a spent sulfite cooking liquor in such a form that they can be easily and quickly separated out, as by filtering or centrifuging, and washed free of sugars and other soluble impurities. Furthermore, unexpectedly the lignosulfonate and the quaternary ammonium salt can be readily regenerated by the use of a neutral salt such as NaCl or KCl.

It has been known for many years that various primary, secondary, and particularly tertiary organic amines form water-insoluble precipitates with lignosulfonates when added to solutions of the same. No practical commercial use has been made of this knowledge, however, because the incompleteness of the precipitation and the gelatinous nature of the precipitate make it extremely difficult (if not impossible) to recover the lignosulfonate product in reasonably pure form and good yield. The use of the quaternary ammonium salts of the present invention, on the other hand, provides a solution to the problem as well as an improved method of fractionating the purified lignosulfonate product according to molecular weight to better fit it for special usages when desired.

The reason for the improved processability and ease of regenerating the ligninsulfonate on using quaternary ammonium salts is apparently due to the fact that, in contrast to primary, secondary or tertiary amines, quaternary ammonium bases are highly disassociated and therefore strong bases. These bases are comparable in strength to inorganic alkalies rather than to amines. This is illustrated in the following table taken from A. F. Holleman, Organic Chemistry, by J. P. Wibaut, Elsevier Publishing Company, New York, 1951, which gives the degree of disassociation relative to that of LiOH taken as 100:

LiOH _____ 100
NaOH _____ 98
[N(C₂H₅)₄]OH _____ 75
[N(C₂H₅)₃H]OH _____ 14
[N(C₂H₅)₂H₂]OH _____ 16
[N(C₂H₅)H₃]OH _____ 12
NH₄OH _____ 2

It is well known that salts of primary, secondary and tertiary amines are readily decomposed by alkali and quaternary ammonium salts are not. However, the present invention shows very unexpectedly that the regeneration of the quaternary ammonium salt and the lignosulfonate can be carried out with alkali or even with a neutral salt.

The quaternary ammonium salts found useful in the process of the invention can be represented by the following structural formula:

wherein R is an alkyl or aryl radical having from 1 to 20 carbon atoms, at least one of which must contain a minimum of 8 carbon atoms, and A⁻ is an inconsequential anion such as Cl⁻, Br⁻ and OH⁻. Typical quaternary ammonium salts of this class are:

methyldodecyl benzyl trimethyl ammonium chloride
methyldodecylxylene bis (trimethyl ammonium chloride)
n-alkyl (C₁₄, C₁₂, C₁₆) dimethyl benzyl ammonium chloride
p-diisobutyl phenoxy ethoxy benzyl ammonium chloride
ethyl hexadecyl dimethyl ammonium bromide
diisobutyl cresoxy ethoxy ethyl dimethyl benzyl ammonium chloride (or hydroxide)
soya trimethyl ammonium chloride
polyoxyethylene stearyl methyl ammonium chloride
octadecyl trimethyl ammonium chloride Quaternary ammonium salts of the foregoing class precipitate lignosulfonates from spent sulfite cooking liquors very rapidly at room temperatures in a flocculant, nongelatinous form that settles quickly and is easily separable and washable. This flocculant precipitate is a complex quaternary ammonium lignosulfonate from which the lignosulfonate component can be separated by solution in a lower aliphatic alcohol such as methanol or ethanol and precipitation in the form of an alkali metal lignosulfonate by the addition of a soluble alkali metal hydroxide such as NaOH or KOH or a soluble alkali metal neutral salt such as NaCl or KCl. The alcohol is then recovered by distillation at the proper temperature and the quaternary ammonium salt recovered in its original form by evaporation of excess water.

It is often desirable to fractionate the foregoing lignosulfonate product according to molecular weight and a second embodiment of the invention provides a simple effective method for accomplishing the fractionation. We have discovered that the solubility of the quaternary ammonium lignosulfonate complex aforesaid in methanol, ethanol, etc., varies inversely with the amount of water present and the molecular weight of the lignosulfonate component of the complex. The quaternary ammonium lignosulfonate dissolves readily and completely in pure or 95 percent alcohol. As the alcoholic solution is diluted with water, however, a point is reached where the highest molecular weight quaternary ammonium lignosulfonate starts to precipitate out. (The solution will ordinarily tolerate up to about 20 percent water depending on concentration before precipitation starts.) Then depending upon the degree of fractionation desired in the product, increments of water are added to precipitate the desired molecular weight fractions of the quaternary ammonium lignosulfonate. Once precipitated, each fraction can be removed from the solution and redissolved in concentrated alcohol to form a solution from which the fractionated lignosulfonate is recovered as a pure alkali metal salt in the same manner as in the first embodiment of the invention. The quaternary ammonium salt and alcohol, of course, are recovered in the same manner.

In carrying out a process of the invention, sufficient quaternary ammonium salt of the indicated class is dissolved in water and added to the spent sulfite cooking liquor at ambient temperature to provide about a stoichiometric ratio of quaternary ammonium salt to lignosulfonate and the mixture is agitated. The concentration of total solids dissolved in the spent sulfite cooking liquor is not critical and can range from about 1 to 50 percent, but for reasons of operating efficiency, a concentration of from about 5 to 10 percent is preferred. The reaction goes to completion very rapidly with the lignosulfonate and quaternary ammonium salt combining to form a dense flocculant, nongelatinous precipitate which settles within a minute or two after agitation is stopped, leaving the wood sugars and other impurities still in solution. The excess solution is then decanted or siphoned off and the precipitated quaternary ammonium lignosulfonate recovered by filtration or centrifuging after which it is washed free of impurities with cold water.

The washed quaternary ammonium lignosulfonate precipitate is then dissolved in an aliphatic alcohol (preferably methanol or 95 percent ethanol) to place it in condition for separation of quaternary ammonium salt and lignosulfonate components of the precipitate and their recovery in pure form. If fractionation of the lignosulfonate product is not required, it is precipitated from the alcoholic solution by the addition of a slight excess of an alcoholic solution of a soluble alkali metal hydroxide or neutral salt such as NaOH, KOH or NaCl, KCl, etc. The alkali metal lignosulfonate immediately precipitates out in a dense, rapidly settling form and can be easily separated out and recovered as a pure material.

If it is desired to fractionate the lignosulfonate according to molecular weights, the alcoholic quaternary ammonium lignosulfonate solution prepared as above is diluted with cold water to the point of incipient precipitation of the solute. Then, depending on the number of fractions and the average molecular weight of the lignosulfonate desired in the same, further increments of cold water are added, the first increment precipitating the fraction with the highest molecular weight, etc. As each fraction of the quaternary ammonium lignosulfonate is precipitated, it is removed from the solution, washed with water and dried if desired. It is then redissolved in methanol or ethanol and the quaternary ammonium salt and lignosulfonate components separated as before. The final product is a substantially pure alkali metal lignosulfonate fractionated as desired according to molecular weights.

This invention gives the important result of a rapid and practically complete precipitation of quaternary ammonium lignosulfonate from a spent sulfite cooking liquor without heating and pH control and at any desired concentration. The quaternary ammonium lignosulfonate is in a form which can be easily filtered and washed to effectively remove adhering sugars, inorganic salts and other impurities and thus be separated in high yield from the other materials present in the spent sulfite cooking liquor. An even more important result is that the quaternary ammonium lignosulfonate can be precipitated from an alcoholic solution with plain water, thereby making it possible to fractionate the lignosulfonate product.

The following examples illustrate operations carried out in accordance with the invention:

*Example I*

A typical sample of a mill run, soda-base spent sulfite cooking liquor was procured. The total solids content of the same had the following chemical analysis:

TABLE I.—CHEMICAL ANALYSIS BASED ON TOTAL SOLID

| | Percent |
|---|---|
| Sodium lignosulfonate | 60.50 |
| Wood sugars: | |
| Galactose | 3.85 |
| Glucose | 4.67 |
| Mannose | 14.39 |
| Arabinose | 1.28 |
| Xylose | 3.24 |
| Inorganics and by-products (by difference) | 12.07 |
| | 100.00 |

One gram of the quaternary ammonium salt, diisobutyl cresoxy ethoxy ethyl dimethyl benzyl ammonium chloride in 20 ml. of water was added with stirring to 100 ml. of the foregoing soda-base spent sulfite cooking liquor which contained one gram of sodium lignosulfonate at room temperature. A dense, flocculent precipitate of quaternary ammonium lignosulfonate formed almost instantaneously and settled out within a minute or two after the stirring was stopped. The mixture was then filtered through a Whatman No. 40 filter paper after which the precipitate was washed with three 100-ml. portions of cold water and dried. Ultraviolet spectroscopic analysis of the supernatant liquor and washings indicated that 98 percent of the lignosulfonate had been precipitated. The oven-dried weight of the quaternary ammonium lignosulfonate was 1.77 grams.

The dry quaternary ammonium lignosulfonate was dissolved in 95 percent ethanol at the rate of 10 mg. per ml. of alcohol. To one 25-ml. aliquot of this solution (containing 250 mg. of the quaternary ammonium lignosulfonate) was added 5 ml. of a 95 percent ethanol solution containing one gram of potassium hydroxide. The potassium lignosulfonate precipitated immediately and was recovered by centrifuging and washed four times with 5-ml. portions of ethanol. The washed and dried potassium lignosulfonate (157 mg.) represented a yield of 88 percent of the sodium lignosulfonate present in the original spent cooking liquor.

To a second 25-ml. aliquot of the foregoing alcoholic quaternary ammonium lignosulfonate solution (containing 250 mg. of the quaternary ammonium lignosulfonate) was added 5 ml. of absolute ethanol containing one gram of sodium hydroxide. The sodium lignosulfonate precipitated immediately and was also recovered by centrifuging and washed four times with 5-ml. portions of ethanol. In this case the yield of dried and washed sodium lignosulfonate represented a yield of 87 percent of the sodium lignosulfonate present in the original spent cooking liquor.

To a third 18-ml. aliquot of the alcoholic quaternary ammonium lignosulfonate solution (containing 180 mg. of the quaternary ammonium lignosulfonate) was added 100 ml. of 95 percent ethanol containing 15 mg. of sodium chloride. The sodium lignosulfonate once again precipitated almost instantly. After one minute of stirring, it was removed by filtration and washed four times with 5-ml. portions of 95 percent ethanol and dried. After drying, it weighed 77 mg. and comprised 96.5 percent pure sodium lignosulfonate as determined by ultraviolet spectroscopy. This represents an overall yield of 73 percent of the sodium lignosulfonate present in the original spent sulfite cooking liquor.

*Example II*

This example illustrates the fractionation of a quaternary ammonium lignosulfonate according to the molecular weights of the lignosulfonate component therein.

A fairly large sample of unfractionated quaternary ammonium lignosulfonate was prepared from the same soda-base, spent sulfite cooking liquor as used in Example I. The same quaternary ammonium salt was used in the same proportions and the product was recovered in the same manner. Thirty-eight grams of the washed and dried quaternary ammonium lignosulfonate product was dissolved in 450-ml. of methanol at room temperature. Forty-four ml. of distilled water was then added to this solution with stirring from a buret at room temperature whereupon a dense precipitate of quaternary ammonium lignosulfonate was formed. It was removed by centrifuging and labeled "Fraction 1." A second fraction of quarternary ammonium lignosulfonate was obtained in a similar manner by the addition of 62 ml. more of water and a third by the addition of another 100 ml. of water, etc. The methanol-water solution itself was then evaporated to dryness in a vacuum oven to form "Fraction 4." Table II shows relative number average molecular weights of the four fractions as determined with the Mechrolab vapor pressure osmometer.

TABLE II

| Fraction No. | Pct. of Total Quaternary Ammonium Lignosulfonate | Relative Number Avg. Molecular Weight |
| --- | --- | --- |
| 1 | 16 | 4,000 |
| 2 | 28 | 2,500 |
| 3 | 15 | 1,400 |
| 4 | 41 | 360 |

Although the foregoing "relative number average molecular weights" are not absolute values for molecular weights, they clearly illustrate the large variance in the average molecular weight of the several fractions.

*Example III*

The process of the invention is applicable to the recovery and fractionation of lignosulfonates from spent sulfite cooking liquors regardless of the base used. In addition, the number of fractions that a given lignosulfonate material can be divided into can be tailored to fit the characteristics desired in the product. To illustrate this a sample of mill run, ammonia base, spent sulfite cooking liquor was obtained. To it was added a stoichiometrically equivalent amount of the quaternary ammonium salt diisobutyl cresoxy ethoxy ethyl dimethyl benzyl ammonium chloride at room temperature and the mixture stirred as in Example I. The precipitated quaternary ammonium lignosulfonate was recovered, washed and dried; the yield based on the ammonium lignosulfonate in the original spent liquor sample being in excess of 95 percent.

5.4 grams of the foregoing quaternary ammonium lignosulfonate was then dissolved in 50 ml. of methanol and fractionated with distilled water as in Example II. Table III shows the amount of water added to obtain each fraction, the percent of the total quaternary ammonium lignosulfonate present in each fraction, the relative number average molecular weight of each fraction as determined with the Mechrolab vapor pressure osmometer and the percent of the quaternary ammonium lignosulfonate present in each fraction that is lignosulfonate (calculated as sodium lignosulfonate) as determined by ultraviolet spectroscopy.

TABLE III

| Fraction Number | Water Added, ml. | Percent of Total Quaternary Ammonium Lignosulfonate | Relative Number Average Molecular Weight | Percent of Fraction That is Sodium Lignosulfonate |
| --- | --- | --- | --- | --- |
| 1 | 4.5 | 8.6 | 13,000 | 59 |
| 2 | 3.0 | 14.3 | 7,000 | 56 |
| 3 | 1.5 | 8.5 | 3,500 | 50 |
| 4 | 1.5 | 9.3 | 3,600 | 50 |
| 5 | 1.5 | 5.5 | 4,300 | 51 |
| 6 | 1.5 | 6.5 | 2,400 | 50 |
| 7 | 3.0 | 9.1 | 2,300 | 49 |
| 8 | 4.0 | 7.8 | 2,100 | 43 |
| 9 | 6.0 | 7.9 | 1,600 | 39 |
| 10 | ¹0.0 | 20.5 | 300 | 6.5 |
|  |  | 99.0 |  |  |

¹ Solution evaporated.

*Example IV*

This sample illustrates the effectiveness of several quaternary ammonium salts of the indicated class in the process of the invention.

A sample of mill run, soda-base spent sulfite cooking liquor was obtained and the content of total solids therein adjusted so that each 100 ml. contained exactly one gram of sodium lignosulfonate. To 100-ml. portions of this adjusted liquor at room temperature was added 20 ml. of an aqueous solution of one of the quaternary ammonium salts listed in Table IV, said solution containing exactly one gram of said quaternary ammonium salt, and the mixture stirred. The dense quaternary ammonium lignosulfonate precipitate formed immediately and was filtered out on Whatman No. 40 filter paper, washed three times with 100-ml. portions of water and dried in a vacuum oven.

250 mg. of the dry quaternary ammonium lignosulfonate was then dissolved in 95 percent ethanol and the lignosulfonate precipitated as sodium lignosulfonate by the addition of 20 ml. 95 percent ethanol containing 28 mg. of sodium chloride. The sodium lignosulfonate which precipitated and settled very rapidly was recovered by filtration on a 5-micron pore size filter, washed twice with 20-ml. portions of 95 percent ethanol and dried in a vacuum oven. Its purity was determined by U.V. measurements at a wave length of 232.6 mu.

Table IV gives the name of the quaternary ammonium salt, the purity of the recovered sodium lignosulfonate, and the yield of recovered sodium lignosulfonate in percent based on the amount of lignosulfonate in the spent liquor.

TABLE IV

| Number | Quaternary Ammonium Salt | Purity Percent NaLS | Yield, Percent |
| --- | --- | --- | --- |
| 1 | N-alkyl (C₁₄,C₁₂,C₁₆) dimethyl benzyl ammonium chloride. | 95.5 | 71.4 |
| 2 | Methyldodecylbenzyl trimethyl ammonium chloride. | 89.4 | 73.0 |
| 3 | Methyldodecylxylylene bis (trimethyl ammonium chloride). | 89.4 | 73.0 |
| 4 | Polyoxyethylene (2) stearyl methyl ammonium chloride. | 96.5 | 68.0 |
| 5 | Soya trimethyl ammonium chloride. | 95.5 | 67.0 |
| 6 | Octadecyl trimethyl ammonium chloride. | 92.6 | 43.6 |
| 7 | Para di-isobutyl phenoxy ethyl dimethyl benzyl ammonium chloride. | 93.8 | 39.4 |
| 8 | Lauryldimethyl piperidinium ammonium bromide. | 75.7 | 69.0 |

*Example V*

A typical mill run soda-base spent sulfite cooking liquor with a chemical composition similar to that shown in Example 1, Table I was used to prepare a semiworks batch of sugar-free sodium ligninsulfonate.

To 81.5 pounds of a water solution containing 4.24 pounds of sodium ligninsulfonate and 7.25 pounds of total solids was added 91.77 pounds of a water solution containing 2.72 pounds of methyl dodecyl benzyl trimethyl ammonium chloride and 0.7 pound of methyl dodecyl xylylene bis trimethyl ammonium chloride. This solution was added to the spent sulfite cooking liquor by a centrifugal pump at the rate of approximately 40 pounds per minute. The solution was agitated during the addition and for one minute after the addition was completed. The quaternary ammonium ligninsulfonate precipitate was recovered by filtering through a linen sheet. The precipitate was washed by slurrying the wet cake with 60 pounds of water for five minutes and again recovered by filtration.

The wet cake (11 pounds) contained 43 percent water and 32.6 percent ligninsulfonate as sodium ligninsulfonate, representing a yield of 84 percent, based on the sodium ligninsulfonate in the starting material.

Sodium chloride (0.44 pound) was mixed with 4.4 pounds of the wet cake. This caused 0.65 pound of water to separate out, which was decanted from the solids and discarded. The wet cake containing sodium chloride was mixed with 13 gallons of 95 percent ethanol. This slurry was stirred for one hour to insure complete solubilization of the quaternary ammonium chloride. The precipitate, sodium ligninsulfonate was recovered by filtering through a linen sheet. The recovered sodium ligninsulfonate was washed with four, two-gallon aliquots of 95 percent ethanol.

The product after drying at 50° C., weighed 1.36 pounds and contained 9 percent water. The sodium ligninsulfonate content on an oven-dry basis was 92 percent. This represented a yield of 66.5 percent, based on the original sodium ligninsulfonate in the starting material.

The product had the following chemical analysis, reported on an oven-dry basis:

| | Percent |
|---|---|
| Sodium ligninsulfonate | 92 |
| Sulfur | 5.8 |
| Sulfated ash | 16.9 |
| Galactose | 0.12 |
| Glucose | 0.5 |
| Mannose | 0.51 |
| Arabinose | 0.05 |
| Xylose | 0.12 |

We claim:

1. The process for the separation of lignosulfonate from spent sulfite liquor which comprises adding to said liquor a high molecular weight quaternary ammonium salt and precipitating the quaternary ammonium lignosulfonate, washing the precipitate with water, drying the precipitate, dissolving the dried precipitate in a lower aliphatic alcohol, adding to the alcoholic solution an alkali metal salt of the group consisting of sodium chloride and potassium chloride to precipitate alkali metal lignosulfonate, and separating the alkali metal lignosulfonate precipitate from the alcoholic solution.

2. The process for the separation of lignosulfonate from spent sulfite liquor which comprises adding to said liquor a high molecular weight quaternary ammonium salt and precipitating the quaternary ammonium lignosulfonate, washing the precipitate with water, drying the precipitate, dissolving the dried precipitate in a lower aliphatic alcohol, adding to the alcoholic solution a neutral salt of an alkali metal to precipitate alkali metal lignosulfonate, and separating the alkali metal lignosulfonate precipitate from the alcoholic solution.

References Cited by the Examiner

UNITED STATES PATENTS

| | | | |
|---|---|---|---|
| 2,541,058 | 2/1951 | Heritage et al. | 260—124 |
| 2,850,492 | 9/1958 | Erskine | 260—124 |
| 2,865,906 | 12/1958 | Hoye | 260—124.3 |

CHARLES B. PARKER, *Primary Examiner.*

D. R. PHILLIPS, *Assistant Examiner.*